(12) United States Patent
Bickel

(10) Patent No.: US 9,077,208 B2
(45) Date of Patent: Jul. 7, 2015

(54) METHOD OF DETECTING INSTABILITY IN ISLANDED ELECTRICAL SYSTEMS

(75) Inventor: Jon A. Bickel, Murfreesboro, TN (US)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 860 days.

(21) Appl. No.: 13/341,166

(22) Filed: Dec. 30, 2011

(65) Prior Publication Data

US 2013/0169309 A1   Jul. 4, 2013

(51) Int. Cl.
*G01R 31/40* (2014.01)
*H02J 3/46* (2006.01)
*H02J 3/24* (2006.01)

(52) U.S. Cl.
CPC .... *H02J 3/46* (2013.01); *H02J 3/24* (2013.01)

(58) Field of Classification Search
CPC ...... G01R 31/40; G01R 31/42; G01R 31/025; G01R 31/026; H02J 3/46; H02J 3/24
USPC ............. 324/764.01, 500, 537; 340/506, 511; 361/1
See application file for complete search history.

(56) References Cited

U.S. PATENT DOCUMENTS

| | | | |
|---|---|---|---|
| 3,654,479 A | 4/1972 | Catherin | 250/231 |
| 3,973,087 A | 8/1976 | Fong | 179/170 R |
| 4,855,671 A | 8/1989 | Fernandes | 324/127 |
| 5,272,439 A | 12/1993 | Mashikian et al. | 324/520 |
| 5,319,513 A | 6/1994 | Lowenstein et al. | 361/113 |
| 5,473,244 A | 12/1995 | Libove et al. | 324/126 |
| 5,587,917 A | 12/1996 | Elms | 364/487 |
| 5,808,449 A * | 9/1998 | Hirayama et al. | 322/20 |
| 5,825,656 A | 10/1998 | Moore et al. | 702/60 |
| 5,874,903 A | 2/1999 | Shuey et al. | 340/870.02 |
| 5,920,852 A | 7/1999 | Graupe | 706/26 |

(Continued)

FOREIGN PATENT DOCUMENTS

| | | | |
|---|---|---|---|
| EP | 0746078 A2 | 4/1996 | |
| EP | 0710846 | 5/1996 | G01R 23/16 |

(Continued)

OTHER PUBLICATIONS

Bourke, P. "AutoCorrelation—2D Pattern Identification." Aug. 1996 (11 pages).

(Continued)

*Primary Examiner* — Jermele M Hollington
*Assistant Examiner* — Giovanni Astacio-Oquendo
(74) *Attorney, Agent, or Firm* — Lando & Anastasi LLP

(57) ABSTRACT

Systems and methods for evaluating the stability of an islanded electrical system (off-grid) using high-speed frequency measurements of the electrical signal supplied by an alternate power source in the islanded electrical system. Additional inputs may include status signals from an automatic transfer switch, a generator, and loads within the islanded electrical system. The high-speed frequency measurements have a resolution sufficient to enable analysis of any combination of the frequency magnitude (e.g., sudden increase), frequency slew rate (e.g., frequency rate of change), frequency rate of recovery (e.g., frequency recovery time), or frequency oscillations (e.g., frequency ringing around the nominal value before settling) to indicate the presence of an actual or impending instability of the islanded electrical system. The frequency referred to herein corresponds to the frequency at which an alternating current supplied by the alternate power source is cycling.

20 Claims, 5 Drawing Sheets

(56) References Cited

U.S. PATENT DOCUMENTS

| | | | |
|---|---|---|---|
| 5,978,371 A | 11/1999 | Mason, Jr. et al. | 370/389 |
| 6,005,759 A | 12/1999 | Hart et al. | 361/66 |
| 6,016,465 A | 1/2000 | Kelly | 702/116 |
| 6,020,657 A | 2/2000 | Liran | 307/64 |
| 6,088,659 A | 7/2000 | Kelley et al. | 702/62 |
| 6,094,650 A | 7/2000 | Stoffel et al. | 707/3 |
| 6,100,817 A | 8/2000 | Mason, Jr. et al. | 340/870.02 |
| 6,266,452 B1 | 7/2001 | McGuire | 382/294 |
| 6,288,456 B1 | 9/2001 | Cratty | 307/64 |
| 6,292,683 B1 | 9/2001 | Gupta et al. | 600/410 |
| 6,421,256 B1 | 7/2002 | Giannopoulos et al. | 363/21.12 |
| 6,574,672 B1 | 6/2003 | Mitchell et al. | 709/250 |
| 6,694,125 B2 | 2/2004 | White et al. | 455/16 |
| 6,731,904 B1 | 5/2004 | Judd | 455/11.1 |
| 7,046,534 B2 | 5/2006 | Schmidt et al. | 363/132 |
| 7,065,350 B2 | 6/2006 | Capobianco et al. | 455/422.1 |
| 7,079,808 B2 | 7/2006 | Striemer | 455/7 |
| 7,079,984 B2 | 7/2006 | Eryurek et al. | 702/185 |
| 7,089,125 B2 | 8/2006 | Sonderegger | 702/57 |
| 7,225,087 B1* | 5/2007 | Siciliano et al. | 702/58 |
| 7,265,334 B2 | 9/2007 | Draper et al. | 250/214 R |
| 7,272,518 B2 | 9/2007 | Bickel et al. | 702/61 |
| 7,408,268 B1* | 8/2008 | Nocentini et al. | 307/16 |
| 7,761,910 B2 | 7/2010 | Ransom et al. | 726/6 |
| 8,082,367 B2 | 12/2011 | Etheridge et al. | 709/248 |
| 2002/0116282 A1 | 8/2002 | Martin et al. | 705/26 |
| 2002/0120519 A1 | 8/2002 | Martin et al. | 705/21 |
| 2003/0014678 A1 | 1/2003 | Ozcetin et al. | 713/400 |
| 2003/0033094 A1 | 2/2003 | Huang | 702/39 |
| 2003/0222509 A1 | 12/2003 | Andarawis et al. | 307/139 |
| 2004/0032168 A1 | 2/2004 | Allison et al. | 307/64 |
| 2004/0121648 A1 | 6/2004 | Voros | 439/535 |
| 2004/0225649 A1 | 11/2004 | Yeo et al. | 707/3 |
| 2005/0050095 A1 | 3/2005 | Hurtis et al. | 707/104.1 |
| 2005/0197806 A1 | 9/2005 | Eryurek et al. | 702/188 |
| 2005/0200205 A1 | 9/2005 | Winn et al. | 307/64 |
| 2006/0167569 A1 | 7/2006 | Colombi et al. | 700/22 |
| 2006/0271244 A1 | 11/2006 | Cumming et al. | 700/291 |
| 2007/0005275 A1 | 1/2007 | Bickel et al. | 702/60 |
| 2007/0014313 A1 | 1/2007 | Bickel et al. | 370/503 |
| 2007/0096680 A1 | 5/2007 | Schroeder et al. | 318/723 |
| 2007/0179726 A1 | 8/2007 | Bickel | 702/69 |
| 2007/0206521 A1 | 9/2007 | Osaje | 370/315 |
| 2007/0236359 A1 | 10/2007 | Wynans et al. | 340/664 |
| 2008/0065712 A1 | 3/2008 | Bickel | 708/422 |
| 2008/0065715 A1 | 3/2008 | Hsu et al. | 709/203 |
| 2011/0068631 A1* | 3/2011 | Roscoe | 307/69 |

FOREIGN PATENT DOCUMENTS

| | | | |
|---|---|---|---|
| GB | 2220753 | 1/1990 | G01R 23/02 |
| WO | 00/40977 | 7/2000 | G01R 21/133 |
| WO | 00/65480 | 11/2000 | G06F 17/30 |
| WO | 03/030396 | 4/2003 | H04B 3/54 |
| WO | 2004/032371 | 4/2004 | H04B 7/15 |
| WO | 2005/055478 | 6/2005 | H04B 1/38 |
| WO | 2005/059572 | 6/2005 | G01R 11/00 |
| WO | 2007/005547 | 1/2007 | G06K 9/62 |
| WO | 2007/032944 | 3/2007 | G01R 31/02 |

OTHER PUBLICATIONS

Coggins, D. et al. "Initial Experiences with a New FPGA Based Traveling Wave Fault Recorder Installed on a MV Distribution Network." Power System Technology and IEEE Power India Conference, IEEE, Piscataway, NJ. Oct. 12, 2008 (8 pages).

Bingham, R. "The Need for Speed." Dranetz-BMI, dated Nov. 1999, 12 pages.

"GPS World—Pacify the Power GPS Harness for Large-Area Electrical Grid," by Dennis Erickson and Carson Taylor, dated Apr. 1, 2005, 9 pages.

Valdes, M. E. et al. "Protection, Control, Reliability and Diagnostic Improvements via Single-Processor Control of Circuit Breakers in Low Voltage Switchgear," IEEE, 2004 (10 pages).

Bickel, J. Square D/Schneider Electric, "Identifying Problems From Transients in Power Systems," LaVergne, TN,—Plant Engineering, Sep. 1, 2004, (6 pages).

Reber, S. et al. "Innovation to Reality—Introducing State-Of-The-Art Protection and Monitoring to Existing Low-Voltage Switchgear," IEEE, copyright 2005 (11 pages).

"Entellisys™Low-Voltage Switchgear," GE Consumer & Industrial Electrical Distribution; dated 2005 (17 pages).

Luo, R. C. et al. "Automated Decision Tree Generation for Object Recognition and Classification." Proceedings of the International Conference on Industrial Electronics, Control and Instrumentation (IECON). Industrial Applications of Mini, Micro and Personal Computers. Sep. 29, 1986 (p. 357-362).

Emanuel, A. E. et al. "Voltage Distortion in Distribution Feeders with Nonlinear Loads." IEEE Transactions on Power Delivery, IEEE Service Center. vol. 9, No. 1, Jan. 1, 1994 (p. 79-87).

Islei, G. et al. "A Decision Support System Using Judgmental Modeling: A Case of R&D in the Pharmaceutical Industry." IEEE Transactions on Engineering Management. vol. 38, No. 3, Aug. 1991 (p. 202-209).

"Power Xpert® 4000/6000/8000 Meters," Eaton Electrical Inc., Copyright © 2001-2007; http://www.eatonelectrical.com/NASApp/cs/ContentServer?GXHC_GX_jst=c7014444662d61 65&G. (3 pages).

"Power Xpert® 4000/6000/8000 Power Quality Meters, Product Focus," Eaton Electrical Inc., Copyright © 2007, (8 pages).

"Next-Generation Power Quality Meters," Eaton Cutler-Hammer White Paper, Eaton Corporation, dated Jan. 2006, (12 pages).

"ION 7650 Intelligent Metering and Control Device," Power Measurement © 1992-2007, http://www.pwrm.com/products/ION7650/, (2 pages).

"ION 7650 Features Summary," Power Measurement © 1992-2007, http://www.pwrm.com/products/ION7650/features/, (2 pages).

"ION 7650 Applications Summary," Power Measurement © 1992-2007, http://www.pwrm.com/products/ION7650/applications/, (2 pages).

"Power Quality—Where did That Event Come From?" Power Logic Solutions, Square D, vol. 7, Issue 2, © 2003, Schneider Electric, (4 pages).

"Power XPert® 4000/6000/8000 Power Quality Meters, Technical Data," Eaton Electrical Inc., Copyright © 2007, (12 pages).

"PowerLogic® ION7550/ION7650 Power Energy Meters," Schneider Electric, Square D. Company, Nov. 2006, (8 pages).

"Performance Power Meter & Data Acquisition Node," Nexus 1250 for Industry and Utilities, Accu-Measure® Technology, Electro Industries/GaugeTech, dated May 25, 2005, (16 pages).

"Transient Power Systems (Part 1 in Transient Series)," PowerLogic Solutions, vol. 6, Issue 1, Square D/Schneider Electric, dated Sep. 2002, (4 pages).

"Transient Power Systems (Part 2 in Transient Series)," PowerLogic Solutions, vol. 6, Issue 2, Square D/Schneider Electric, dated Sep. 2002, (4 pages).

International Search Report corresponding to co-pending International Patent Application Serial No. PCT/EP2012/070109, European Patent Office, dated Jun. 12, 2013; (4 pages).

International Written Opinion corresponding to co-pending International Patent Application Serial No. PCT/EP2012/070109, European Patent Office, dated Jun. 12, 2013; (3 pages).

* cited by examiner

METHOD OF DETECTING INSTABILITY IN ISLANDED ELECTRICAL SYSTEMS

FIELD OF THE DISCLOSURE

The present disclosure relates generally to islanded electrical systems, and more particularly, to systems and methods for anticipating stability problems in an islanded electrical systems and mitigation their effect through load control and management.

BACKGROUND OF THE DISCLOSURE

The proper operation of a hospital's emergency power supply system (EPSS) is critical for seamless life-supporting operations. In the event of an interruption in the hospital's main feed from their utility, the EPSS provides an alternative energy source that maintains operation of all the critical (and many non-critical) loads. Loss of the EPSS in life-supporting systems is more than a mere inconvenience; it can be harmful or even deadly to the patients and adversely affect ongoing tests and procedures.

To this end, the National Fire Protection Association (NFPA) developed standard NFPA 110, titled "Standard for Emergency and Standby Power Systems," which covers "performance requirements for emergency and standby power systems providing an alternate source of electrical power to loads in buildings and facilities in the event that the primary power source fails." The scope of NFPA 110 includes installation, maintenance, operation, and testing requirements as they pertain to the performance of the EPSS.

The NFPA 110 lists many requirements for the installation, maintenance, operation, and testing of EPSSs, which directly affect three primary components of the EPSS: the emergency power supply (EPS), the automatic transfer switches (ATSs), and the protective devices.

Electrical systems in developed countries are typically comprised of large interconnected networks of conductors (called grids) to distribute energy from energy sources to loads. These grids have considerable redundancy, protection schemes, and electrical inertia that typically allow them to ride through faults, load fluctuations, and other transitory electrical system events with minimal adverse effects.

However, an EPSS operates as an islanded electrical system when the preferred electrical source is removed (i.e., when the facility is operating independently from the utility grid). In the event the preferred source is lost, EPSSs will transfer the load to the alternate (or backup) source via an automatic throw-over switch (ATS). An open-transition switching scheme is may be used to ensure that the two sources are completely isolated from each other to eliminate the risk of back-feeding a fault. Hospitals are a prime example of an energy consumer who intentionally islands (isolates) part or all of their electrical system to serve emergency loads.

What is needed is an effective way of predicting or projecting the instability of the system frequency in an islanded electrical system or notifying the end-user of a potential instability issue based on the load's operational behavior before the instability condition occurs, and ameliorating or eliminating the conditions or circumstances that cause such instability to occur. The present disclosure is directed to satisfying these and other needs.

SUMMARY OF THE DISCLOSURE

According to an aspect of the present disclosure, a method of automatically identifying a probable instability condition of an islanded electrical system is provided. The method includes: receiving, using a controller, an indication that power to a plurality of loads has been transferred from a primary power source to an alternate power source electrically isolated from the primary power source to form an islanded electrical system that includes the alternate power source and the loads, the alternate power source providing electrical power to the loads; responsive to receiving the power source change signal, receiving a load status change signal from a load in the islanded electrical system indicating that an operational status of the load has changed; responsive to receiving the first load change signal, receiving frequency magnitude values, according to a first periodicity corresponding to at least one per 100 ms, of the alternating current or voltage measured by an intelligent electronic device (IED) coupled in the islanded electrical system to the alternate power source, and storing frequency data indicative of the measured frequency magnitude values and associated timestamp values corresponding to a time or cycle count each of the frequency magnitude values are measured; based on the received frequency magnitude values, identifying a pickup time corresponding to a detected deviation from a nominal or fundamental frequency of the electrical power and a dropout time corresponding to a restoration of the frequency of the electrical power to the nominal or fundamental frequency; based on at least the pickup time and the dropout time, calculating a rate of recovery for the detected frequency deviation from the nominal or fundamental frequency; the controller determining whether an anomalous condition exists in the islanded electrical system based on at least whether the calculated rate of recovery exceeds a rate of recovery threshold; and responsive to the rate of recovery exceeding the rate of recovery threshold, storing in a memory an indication that the anomalous condition exists.

The rate of recovery can be calculated using an absolute threshold by determining a time period between the pickup time and the dropout time or using a relative threshold by determining a percentage by which the time period between the pickup time and the dropout time exceeds a nominal time period indicating a normal rate of recovery. The alternate power source can include a generator having an engine.

The rate of recovery threshold can correspond to the calculated time period or the calculated percentage plus a threshold tolerance value. The method can further include: the controller calculating a slew rate of frequency based on the frequency data and the timestamp values, where the slew rate of frequency is the rate of frequency change with respect to time; and the controller further determining whether the anomalous condition exists based on the slew rate by determining whether the slew rate exceeds a slew rate threshold.

The method can further include, responsive to the controller determining that the anomalous condition exists based on the calculated rate of recovery, the controller using the calculated slew rate to confirm that the anomalous condition exists. The method can further include: receiving a load change signal from a first of the loads that an operational status of the first load has changed; responsive to receiving the first load change signal, receiving a further set of frequency magnitude values, at least one every 100 ms, of the alternating current or voltage measured by the IED and storing second frequency data indicative of the measured further set of frequency magnitude values and corresponding second timestamp values corresponding to a time each of the further set of frequency magnitude values are measured; the controller calculating a second slew rate of frequency based on the second frequency data and the second timestamp values; and responsive to the second slew rate exceeding a second slew rate threshold, storing a second indication that the islanded electrical system has a potential instability condition.

The determining whether the anomalous condition can be based further on the frequency magnitude values, and further can include the controller comparing the frequency magnitude values with a frequency magnitude threshold. The storing the indication that the anomalous condition exists can be further carried out responsive to any of the frequency magnitude values exceeding the frequency magnitude threshold.

The method can further include receiving, using the controller, a status signal from the ATS indicating that power to the loads has been transferred. The frequency magnitude values can be received responsive to the receiving the power source change signal from the ATS.

The method can further include receiving, using the controller, a load status change signal from a first of the loads indicating a change of status of the first load. The frequency magnitude values can be received responsive to the receiving the load status change signal from the first load.

The method can further include: changing the first periodicity at which the frequency magnitude values are measured to a second periodicity that is slower than the first periodicity when a steady-state condition is achieved in the islanded electrical system, where in the steady-state a frequency of the electrical current provided by the alternate power source is stable over an interval of time; receiving measured data, according to the second periodicity, of a characteristic of the current or voltage measured by the IED until an anomalous change in the islanded electrical system is detected, where the anomalous change indicates a change in a characteristic of the electricity provided by the alternate power source, a change of a status of the alternate power source, a change in a characteristic of the alternate power source, or a change of a status of any of the loads in the islanded electrical system; and responsive to detecting the anomalous change, changing the second periodicity back to the first periodicity and causing the IED to measure frequency magnitude values according to the first periodicity over a predetermined interval of time.

The characteristic of the electricity can include current or voltage or a value derived from the current or the voltage. The status of the alternate power source can include on or off. The characteristic of the alternate power source can include a speed at which an engine of the alternate power source is rotating or a voltage output of the alternate power source. The status of any of the loads can include at least on or off.

The alternate power source can include an uninterruptible power supply. The method can further include: receiving, using the controller, voltage data indicative of a voltage measured by the IED; and using the measured voltage data to verify whether the anomalous condition exists in the islanded electrical system by comparing whether changes in the voltage data track changes in the frequency data.

The slew rate threshold can include a low threshold below the nominal or fundamental frequency and a high threshold above the low threshold and above the nominal or fundamental frequency. The determining whether the slew rate exceeds the slew rate threshold can include determining whether the slew rate is above the high threshold or below the low threshold. The method can further include: responsive to the slew rate being above the high threshold, determining whether at least one of the loads is available to be turned on, and if so, causing the frequency of the alternating current to decrease by turning on the at least one load; and responsive to the slew rate being below the low threshold, determining whether at least one of the loads is available to be turned off, and if so, causing the frequency of the alternating current to increase by turning off the at least one load.

The method can further include: determining, using the controller, an operational status of each of the at least some loads, the operational status including running in which the load is turned on or stopped in which the load is turned off; and storing in the memory information indicating which of the loads was turned on or off in response to the determining whether the slew rate exceeds the slew rate threshold and when and by how much the frequency of the electrical power increased or decreased in response to turning the load on or off along with a timestamp corresponding to the time that the load was turned on or off.

The alternate power source can include a generator. The method can further include: determining, using the controller, an operational status of the generator, the operational status including running indicating that the generator is running, on indicating that the generator is starting or on, or off indicating that the generator is stopping or off; comparing using a statistical function the frequency data or the calculated slew rate with present or historical data associated with the islanded electrical system to project an instability trend or predict a future performance of the islanded electrical system; and based on the comparing, storing in the memory a result indicative of the projected instability trend or the predicted future performance.

The method can further include: determining whether the operational status of the generator is starting, and if not: comparing using a statistical function the calculated slew rate with a historical slew rate to project an instability trend of the islanded electrical system, or comparing using a statistical function the frequency data with a present or historical voltage or current of the electrical power measured by the IED to project an instability trend of the islanded electrical system; and if the operational status of the generator is starting: determine a pick up time for the generator to pick up one of the loads and compare using a statistical function the pick up time with a historical pick up time for the generator to predict a future performance of the generator in the islanded electrical system, or determine an actual loading of the generator while the generator is running and comparing the actual loading with a historical loading for the generator to predict a future performance of the generator in the islanded electrical system, or calculate a speed of the generator as the generator is starting and a time elapsed for the generator to transition from the starting to the running operational status and compare using a statistical function the calculated speed and elapsed time with a historical speed and elapsed time for the generator to predict a future performance of the generator in the islanded electrical system, or comparing using a statistical function the frequency data while the generator is transitioning from the starting to the running operational status with corresponding frequency data measured while the operational status of the generator is running to project an instability trend of the islanded electrical system.

According to another aspect of the present disclosure, a method of automatically identifying a probable instability condition of an islanded electrical system is provided. The method includes: receiving, using a controller, an indication that power to a plurality of loads has been transferred from a primary power source to an alternate power source electrically isolated from the primary power source to form an islanded electrical system that includes the alternate power source and the loads, the alternate power source providing electrical power in the form of an alternating current to the loads; responsive to receiving the indication that power to the loads has been transferred to the alternate power source, receiving a load status change signal indicating that an operational status of a load in the islanded electrical system has changed, causing a frequency deviation event in which a frequency of the alternating current deviates from a nominal or fundamental frequency of the alternating current; responsive to receiving the load status change signal, receiving frequency magnitude values, according to a first periodicity corresponding to at least one per cycle of the alternating current, of the alternating current or voltage signal measured by an intelligent electronic device (IED) coupled in the islanded electrical system to the alternate power source, and storing frequency data indicative of the measured frequency magnitude values; the controller analyzing the received frequency magnitude values to identify oscillations in the measured frequency magnitude values above and below a nominal or fundamental frequency for the alternating current during the frequency deviation event, the analyzing including quantifying a severity of the oscillations based on a number of times the measured frequency values exceed or drop below the nominal or fundamental frequency by more than a predetermined threshold; the controller determining whether an anomalous condition exists in the islanded electrical system based on at least the severity of the oscillations during the frequency deviation event; and responsive to the controller determining that the anomalous condition exists, storing in a memory an indication that the anomalous condition exists.

The alternate power source can include a generator having an engine. The predetermined threshold can be based on a pickup or dropout alarm associated with the engine of the generator.

The method can further include: receiving associated timestamp values corresponding to a time each of the frequency magnitude values are measured; the controller calculating a slew rate of frequency based on the frequency data and the timestamp values, where the slew rate of frequency is the rate of frequency change with respect to time; and the controller further determining whether the anomalous condition exists based on the slew rate by determining whether the slew rate exceeds a slew rate threshold.

The method can further include: based on the received frequency magnitude values, identifying a pickup time corresponding to a detected deviation from a nominal or fundamental frequency of the alternating current and a dropout time corresponding to a restoration of the frequency of the alternating current to the nominal or fundamental frequency; based on the pickup time and the dropout time, calculating a rate of recovery for the detected frequency deviation from the nominal or fundamental frequency; the controller further determining whether the anomalous condition exists in the islanded electrical system based on whether the calculated rate of recovery exceeds a rate of recovery threshold; and responsive to the rate of recovery exceeding the rate of recovery threshold, the controller determining that the anomalous condition exists.

The foregoing and additional aspects of the present disclosure will be apparent to those of ordinary skill in the art in view of the detailed description of various configurations and/or aspects, which is made with reference to the drawings, a brief description of which is provided next.

BRIEF DESCRIPTION OF THE DRAWINGS

The foregoing and other advantages of this disclosure will become apparent upon reading the following detailed description and upon reference to the drawings.

DETAILED DESCRIPTION

Figure 1A:
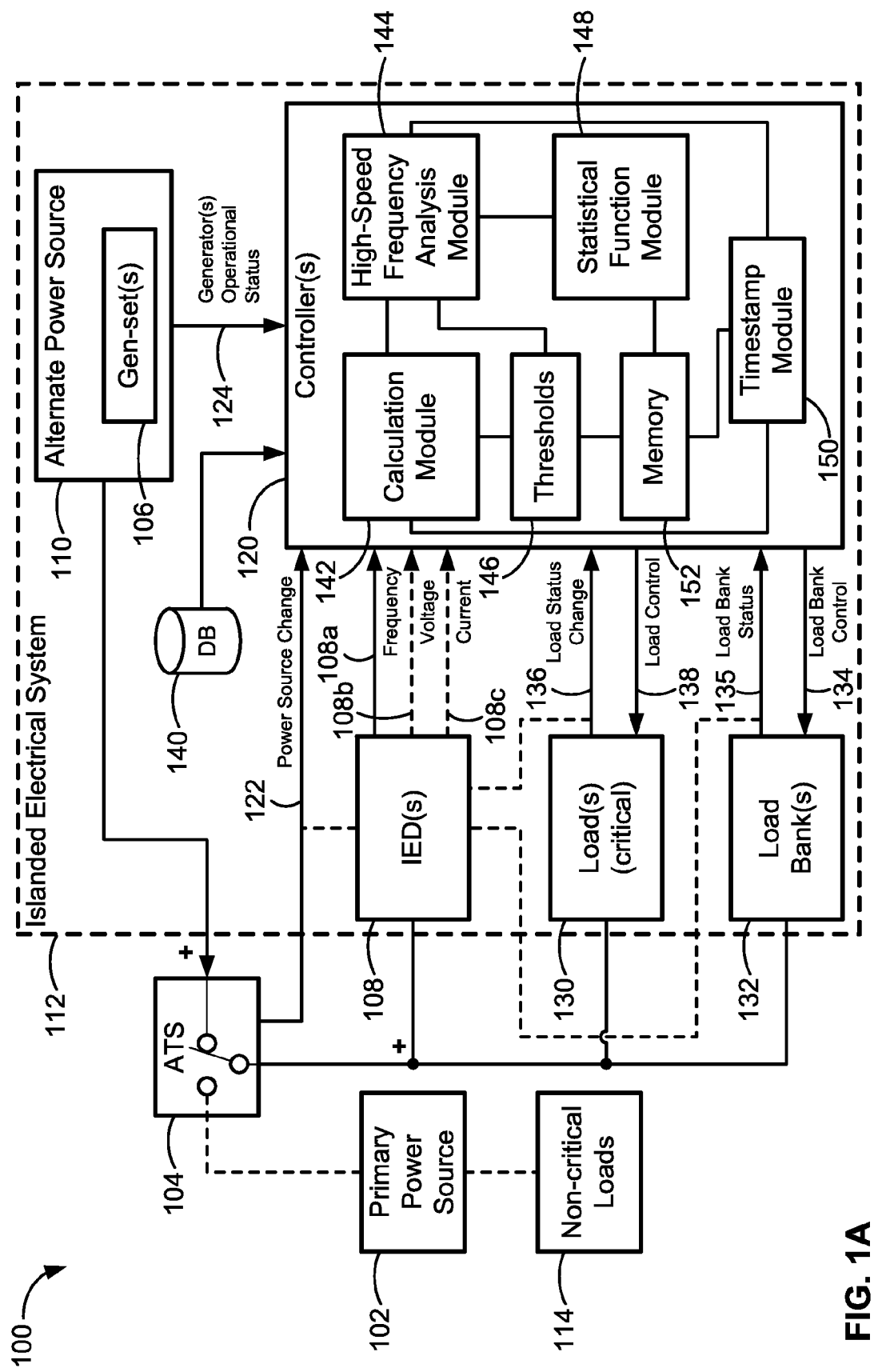
FIG. 1A is a functional block diagram of an exemplary electrical system that normally supplies electrical current to electrical loads within a facility or building, such as a hospital or healthcare facility, from a power source, such as a utility grid.

FIG. 1A is a functional block diagram of an example electrical system 100 that normally supplies electrical current to electrical loads within a facility or building, such as a data center, healthcare facility, or hospital, from a power source, such as a utility grid or primary/preferred/default power source 102. When power supplied by the utility grid (or preferred power source) 102 is interrupted, automatic switching equipment, such as an automatic transfer or throw-over switch (ATS) or a static switch 104, automatically transitions power supplied by the utility grid 102 to an alternate power source 110, which can include one or more generators 104 or a diesel-generator set, as that term is understood by those skilled in the art of power systems, or an interruptible power supply (UPS). In the case of a hospital, the electrical system 100 includes an islanded electrical system 112 that supplies power to essential or critical (and optionally non-critical or non-essential) loads within the hospital that are supplied by life safety or critical branch circuits. The islanded electrical system 112 is electrically isolated from the utility grid 102 to prevent back-feeding of energy from the alternate power source 110 onto the utility grid 102. The islanded electrical system 112 can also be referred to as an emergency power supply system (EPSS). Non-critical loads 114 in the hospital may remain unpowered during a power outage from the utility grid 102. The utility grid 102 conventionally distributes electricity in the form of alternating current (AC) from one or more generating stations of a utility provider onto a grid, which can also be called an electrical power grid.

The nominal or fundamental frequency of the AC current is 50 or 60 Hz, depending on the geographic jurisdiction, or can be as high as 400 Hz in special applications like air and sea vessels. While the fundamental frequency of the grid is generally relatively stable thanks to infrastructure redundancy, protection schemes, and electrical inertia, when power is transferred from the utility grid 102 to the alternate power source 110 to form the islanded electrical system 112, the frequency of the AC power delivered by the alternate power source 110 is more susceptible to load swings, faults, or transitory electrical events due to less redundancy, and less electrical inertia or mass. A frequency deviation is defined by the Institute of Electrical and Electronics Engineers (IEEE) 1159-1995 as "an increase or decrease in the power frequency," which can occur over brief periods of several cycles of AC current (non-steady-state frequency deviation) to longer periods lasting several hours (steady-state frequency deviation). Unless stated otherwise, the term frequency as used herein refers to the nominal or fundamental frequency of an AC power signal, which is conventionally 50 Hz or 60 Hz, and a frequency deviation refers to any deviation from (above or below) the nominal or fundamental frequency.

Islanded electrical systems, such as the islanded electrical system 112, including EPSSs, are more susceptible to frequency deviations for several reasons. An EPSS is a much smaller electrical system, and thus, inherently has substantially less electrical inertia or mass to absorb load swings, faults or other transitory electrical system events. An EPSS has less redundancy to offset energy consumption fluctuations should circumstances warrant. A utility grid 102 has much more diverse load characteristics than an islanded EPSS, which results in a smoother load profile for the utility grid 102 compared to the islanded electrical system 112. Finally, utility grids 102 can employ spinning reserves (which may include a combination of supplemental standby generation and disconnecting loads deemed as interruptible) to support the system frequency and voltage as required; EPSSs, by contrast, are both economically and practicably constrained.

Electrical systems 100 and loads alike are designed to operate most efficiently at their designed nominal frequency, such as 50 Hz or 60 Hz. While minor frequency deviations do regularly occur and might appear to be benign, they can be symptomatic of more ominous problems below the surface. The electrical inertia of an islanded electrical system 112 affects the system's frequency response to electrical perturbations (discussed at the end of this paragraph), and islanded electrical systems are generally more susceptible to frequency deviations due to their smaller size. While standby generators are designed and tested to ensure they are able to sustain a particular load capacity (typically in kilowatts), it is possible for the routine operational dynamics on an islanded electrical system to adversely impact the system's stability and thereby cause significant frequency deviations to occur. Under normal load configurations (connected to the utility grid 102), energizing a motor without employing reduced-voltage starting techniques results in a large inrush or magnetizing current of up to 6-10 times the motor's normal full-load current (FLA) rating and can last nearly one second in some instances. The large inrush current during a motor start will result in some magnitude of corresponding voltage drop, depending on various factors including the system impedance, source capacity, etc. Operating the electrical system in an islanded configuration exacerbates the effects that would normally be experienced due to the decreased inertia of the smaller grid. Both system voltage and frequency will experience a more significant perturbation as a result of the motor start; potentially to the point where the motor may not start or achieve its rated speed, or where other loads are adversely affected. If additional dynamics are considered such as the coincident operation of other loads including motors, the generator may not be able to recover and subsequently trip offline, which in critical applications such as hospitals would be highly undesirable. An oscillatory perturbation on the system frequency may be seen as one or more higher or lower frequency components that ride on top of the system frequency, causing a ringing effect. This type of perturbation results in the composite frequency that is measured by the IED to deviate from the bounded nominal or fundamental value or acceptable range that is expected. A unidirectional perturbation on the system frequency occurs when the system frequency exceeds or drops below the nominal or fundamental value.

Hospitals can employ various equipment having tight energy source tolerances, and the impact of frequency deviations on these particular loads are load-dependent. Each load is designed to operate under a specific set of design parameters, and its operation may be unpredictable when operating outside of these rated parameters. When operating outside of a load's rated parameters, the best-case scenario is that a load will not operate efficiently; the worst-case scenario is that a load will operate intermittently or not at all. Ferroresonant transformers (also called constant-voltage transformers or CVT) are commonly used to provide a stable voltage level for sensitive loads, but are adversely affected by fluctuations in the system frequency. Frequency deviations affect the output voltage of a ferroresonant transformer in a nearly linear manner. For example, a 10% drop in frequency (due to a load starting) will reduce the output voltage of a CVT by roughly 13%. Conversely, a 10% rise in the frequency (due to a load dropping offline) will increase the output voltage of a CVT by roughly 13%. Again, it should be noted that these are the effects of frequency deviations on the output voltage of a device whose purpose is to provide power-conditioning for critical loads; the ultimate consequences of frequency deviations are always load-dependant.

The present disclosure provides feedback to the end-user of an EPSS or other critical application regarding the effects of system frequency deviations on their respective islanded electrical system. Aspects of the present disclosure evaluate the system frequency at intervals that can indicate potential issues with the electrical system's stability. The present disclosure evaluates the frequency when it matters (e.g., immediately after a transition from utility grid power to alternate power or when a load change occurs), at a high resolution, for example once or twice per cycle of AC current (or 60-120 times per second). These aspects will be described in more detail below in connection with the drawings. A summary of some of the capabilities of aspects of the present disclosure is provided below.

1. Grid Stability Alarm and Statistics. The frequency slew rate, rate of recovery of the frequency, or a magnitude of frequency oscillations, is calculated and compared with predefined threshold settings, and an alarm can be used to indicate when any of these parameters exceed the threshold settings. These threshold settings can be based on, for example, the rate of frequency change, the magnitude of change of the frequency, or a weighted or non-weighted combination of both. Trends and reports concerning the periodicity and duration of stability alarms during tests of the islanded electrical system 112 are also contemplated. A start signal from a control system in the islanded electrical system 112 can trigger a high-speed frequency sample rate in the intelligent electronic device (IED) 108, such as a power meter. Continuous high-speed frequency sampling can be employed, such as in conjunction with a co-processor, with data buffering in the high-speed frequency analysis module 144. Statistical analysis in the statistical function module 148 can determine trending for instability of the islanded electrical system or future performance based on thresholds.

2. Speed Alarm and Statistics. In alternate power sources that include a diesel generator, the engine's speed directly correlates with the system frequency. Both startup (e.g., when the diesel engine is turned on after the ATS switch transfers power from the utility grid 102 to the alternate power source 110) and steady-state parameters of the engine are considered, and statistical trends and reports of various characteristics of power (voltage, current, frequency, etc.) are provided. The rate of change of a diesel generator start is evaluated based on historical starts of the same diesel generator set and reported to the end-user. Should the EPSS incorporate multiple diesel generators, the starting and running criteria are compared and trended between the various combinations of diesel generator sets.

3. Voltage Analysis. The system voltage is evaluated with respect to the system frequency. Voltage and frequency are related in power systems (this relationship becomes much more apparent as the system impedance increases and/or the system load changes, faults occur, etc.), a relationship (e.g., high-speed voltage/frequency, etc.) is determined that reflects the degree of an islanded electrical system's stability under dynamic operating conditions. Ultimately, these indices may reveal a risk of some critical or essential load(s) ability to adequately start or operate (e.g., electric motors). Uniformity of these values during load starting conditions (assuming the system frequency remains relatively constant) is advantageous; however, uniformity with fluctuating system frequency values is not advantageous. Again, historical trending of these values can be used to ascertain the evolution of the islanded electrical system and to assist in troubleshooting potential stability issues in the islanded electrical system.

4. Load Current Analysis. The diesel generator load current is evaluated with respect to the system frequency. Relating the starting and/or steady-state load currents (e.g., high-speed current/frequency, etc.) with the system frequency is an indicator of an islanded electrical system's stability (the higher the ratio, the less stable the system is). Trending and historical analysis of these indices (including the combinatory permutations of multiple diesel generators) is useful for troubleshooting stability issues. New loads added to the islanded electrical system are identified and how they affect the stability of the system frequency is quantified and remedial action can be taken by a managed load control algorithm that selectively turns loads on or off to maintain a stable system frequency.

5. Load Control. As mentioned above, load control is provided to selectively turn loads on or off to maintain a stable system frequency. Loads deemed as non-critical are dynamically managed by evaluating any combination of the aforementioned indices and parameters to maximize the islanded electrical system stability. For example, a managed load starting sequence is employed to avoid turning too many loads on simultaneously, unless a data model indicates a low risk of adverse consequences to system stability.

Aspects of the present disclosure automatically identify frequency deviations in an islanded electrical system 112 as an indication of instability of the islanded electrical system 112 or generally identify a probable instability condition of the islanded electrical system 112. The islanded electrical system 112 includes the alternate power source 110, which can include one or more generators (e.g., one or more engine-generator pairs or gen-sets) or uninterruptible power supplies (UPSs) 106, an automatic throw-over switch (ATS) 104, which transitions the source of power between the utility grid 102 and the alternate power source 112 as power from the utility grid 102 becomes unavailable or available. The islanded electrical system 112 includes an intelligent electronic device (IED) 108 that measures and monitors a characteristic (e.g., frequency, current, voltage, power, energy, any of which may be time-stamped) of electricity, such as at the output of the ATS 104 or the generator 106, using one or more signal lines 116 and stores values indicative of the measured characteristic. The IED 108 can be a power monitor, such as a Series 4XXX Circuit Monitor or an ION7xxx power monitor available from Schneider Electric. Alternatively, the IED 108 can be a component of an electrically driven device capable of measuring electrical characteristics such as a UPS, a CNC Machine, a VFD, a relay, or other such equipment. The IED 108 includes a first output 118a and optionally a second and a third output 118b,c, which output corresponding values or signals indicative of a frequency magnitude, a voltage, or a current, respectively, measured by the IED 108 to one or more controllers 120. The one or more controllers 120 can include one or more controllers or processors and can be incorporated into the IED 108. For convenience, the one or more controllers 120 will be referred to herein as the controller 120, though it should be understood that more than one controller can be used.

The controller 120 receives a status input signal 122 as an input from the ATS 104, which indicates a transition of the ATS 104. The controller 120 also receives a generator operational status signal 124 from the generator 106 indicating the operational status of the generator 106. The operational status of the generator 106 (or by extension the alternate power source 110) includes "off" or "on." Aspects of the present disclosure can determine based on whether the status has changed from off to on or vice versa and how long the generator 106 has been "on" whether the operational status of the generator 106 is "running" indicating that the generator 106 is running, "starting" indicating that the generator 106 is starting, or "stopping" indicating that the generator 106 is stopping.

The term "emergency" in EPSS refers to a condition in which power from the utility grid 102 is unavailable or unsatisfactory, rendering the electrical system 100 into an emergency condition as opposed to a normal or non-emergency condition when power is supplied from the utility grid 102. In some buildings, such as hospitals or datacenters, it is important for certain devices to continue to be powered during a loss of power from the utility grid 102. Devices can be categorized as "critical" or "non-critical," for example, but this terminology should not be confused with the term "emergency" in the context used herein. The electrical system 100 can include an uninterruptible power supply (UPS), which supplies alternate power to critical or important electrical loads within the electrical system 100 during a loss of power from the utility grid 102. The ATS 104 can be connected to one or more loads 130 and optionally to a load bank 132. These are exemplary to show one possible combination of many. The loads 130 are loads deemed to be critical for the hospital or datacenter, for example, in which they are installed, and require alternate power from the alternate power source 110. Life-saving support equipment in hospitals, or servers in a datacenter can be categorized as critical loads. Although critical loads are shown as the load(s) 130, it should be understood that non-critical loads can also be (and often are) coupled to the ATS 104 in the islanded electrical system 112. Some non-critical loads 114 are also connected to the utility grid 102, and can remain offline until the ATS 104 transitions power from the alternate power source 110 back to the utility grid 102.

The load bank 132 can be resistive, capacitive, inductive or a combination thereof, and receives a load bank control signal 134 from the controller 120, and can communicate a load bank status signal 135 to the controller 120 indicating a status of the load bank 132 (e.g., on, starting, stopping, or off). The loads 130 each output a load status change signal 136 indicating a change of status of the load 130 (e.g., the load is on, off, starting, or stopping). If a starting or stopping status is not available, aspects of the present disclosure can determine whether the status of the load 130 is starting or stopping based on an analysis of a transition in the operational status of the load 130 between on and off. Each of the loads 130 also receives a load control signal 138 from the controller 120 to control the status of each of the loads 130. The controller 120 is also coupled to a database 140, such as over a network.

The controller 120 includes a number of functional modules, which can be implemented as hardware, firmware, software, or a combination thereof. The controller 120 includes a calculation module 142, a high-speed frequency analysis module 144, a thresholds module 146, a statistical function module 148, and a timestamp module 150. The controller 120 also includes one or more memory devices 152. The calculation module 142 includes a slew rate calculation module 160, a rate of recovery calculation module 162, and a frequency oscillations calculation module 164 (shown in FIG. 1B), each of which will be described in more detail below. The calculation module 142 is generally responsible for carrying out the calculations, by non-transitory machine-readable instructions executed by the controller 120, which are used to determine whether an instability condition (or potential or probable instability condition) exists in the islanded electrical system 112. The slew rate calculation module 160 generally calculates a slew rate of the system frequency as an indication of the degree of stability of the islanded electrical system 112. The term "system frequency" as used herein refers to the frequency at which the alternating current supplied by the alternate power source 110 is sinusoidally oscillating, which is typically 50 Hz or 60 Hz depending upon the geographic jurisdiction in which the alternate power source 110 is located, or can be as high as 400 Hz in electrical systems present in air and sea vessels. This rated or normal operating frequency is referred to herein as the nominal or fundamental frequency. Deviations away from this frequency may indicate instability in the islanded electrical system 112, so characteristics of the system frequency are monitored for anomalies that can lead to system instability. Thus, system "stability" or "instability" is related to the system frequency. When the system frequency is at or near its nominal or fundamental frequency, the islanded electrical system 112 can be said to be stable. But when the system frequency experiences unexpected deviations or anomalies relative to nominal or fundamental frequency, these deviations or anomalies can be symptomatic of an impending or actual instability condition in the islanded electrical system 112.

The rate of recovery calculation module 162 generally determines how long it takes for the system frequency to return to a bounded range of its nominal or fundamental value (e.g., 50 or 60 Hz) following a deviation in the frequency such as caused by a large load starting or turning off. The frequency oscillations calculation module 164 generally quantifies or characterizes the severity (which can include the duration, magnitude or number of oscillations) of oscillations of the measured frequency above and below the nominal or fundamental value as a measure of system stability or instability. These modules will be described in further detail below, but it should be understood that the instability evaluation can be based on any one or more of the following, which are referred to herein for convenience as "instability characteristics" because they can be used to anticipate or evaluate system stability or instability: magnitude of the measured system frequency, slew rate of the measured system frequency, rate of recovery of the system frequency to restore to the nominal or fundamental frequency, and oscillations about the measured system frequency about the nominal or fundamental frequency value. For example, system instability can be determined based on any one of the foregoing instability characteristics alone or in combination with any one or more other instability characteristics. No one instability characteristic is essential or necessary or required for predicting or evaluating the stability or instability of the islanded electrical system 112. While not intending to limit the present disclosure to any particular combination of instability characteristics, certain instability characteristics and combinations of instability characteristics will be discussed below, but it should be emphasized that any of these examples can be further combined with other instability characteristics or replaced by one or more other instability characteristics.

The controller receives a power source change signal 122 from the ATS 104 indicating that power to the loads 114, 130, 132 has been transferred from the utility grid 102 to an alternate power source 110 that is electrically isolated from the utility grid 102 to form an islanded electrical system 112 that includes the alternate power source 110 and the loads 130, 132 (perhaps including some or all of the non-critical loads 114 powered by the utility grid 102). The alternate power source 110 provides electrical power in the form of an alternating current ("AC current") to the loads 130, 132. The AC current conventionally may have a fundamental or nominal frequency of 50 Hz or 60 Hz, depending upon the jurisdiction of the primary source of power 102.

While the AC current is being supplied to the loads 130, 132 from the alternate power source 110, the controller receives frequency magnitude values 108, according to a first periodicity corresponding to at least one per cycle of the alternating current, of the AC current measured by the IED 108 coupled in the islanded electrical system 112 to the alternate power source 110. The controller stores in the memory 152 frequency data indicative of the measured frequency magnitude values and associated timestamp values corresponding to a time each of the frequency magnitude values are measured. The timestamp values can be applied by the timestamp module 150, which associates each measurement with a time indicated by a clock. Alternately, the IED 108 can apply the timestamps to each measured value and report the timestamps along with each associated measured value to the controller 120. The first periodicity can be more frequent than once per cycle, such as twice per cycle or higher. Once per cycle is a relatively high resolution rate by which to capture frequency measurements, and the high rate is needed by the high-speed frequency analysis module 144 to analyze the frequency data associated with the measured AC current from the alternate power source 110. During normal capture of the frequency measurements by the IED 108, a much lower resolution rate is suitable, such as once per second or slower. The transmitted frequency magnitude values 108 can be in the form of analog current or voltage signals, which are scaled and digitized into corresponding digital values indicative of the measured frequency, or can be digitized by the IED 108 and provided to the controller 120 as a digital value indicative of the measured frequency (e.g., at or near 50 or 60 Hz) of the AC current supplied by the alternate power source 110. The frequency magnitude values are received by the slew rate calculation module 160.

Having received the frequency magnitude values, the slew rate calculation module 160 calculates a slew rate of frequency based on the frequency data and the timestamp values. The slew rate of frequency is the rate of frequency change with respect to time. For example, the slew rate calculation module 160 can calculate the time derivative of the frequency versus time to derive the slew rate. The slew rate provides an indication of the rate the frequency is deviating from its steady-state, nominal or fundamental value (e.g., 50 or 60 Hz). When the measured frequency is relatively stable, the slew rate should be small. However, when the measured frequency experiences a sudden increase or decrease, the slew rate calculation module 160 quantifies this rate of change with respect to time.

The slew rate calculation module 160 can indicate the existence of an anomalous condition in the islanded electrical system 112 based on at least the slew rate (other factors can be taken into account, as detailed below). This determination includes determining whether the slew rate exceeds a slew rate threshold, which can be stored in the thresholds module 146. The slew rate threshold can be determined empirically, such as by operating the loads 130, 132 and/or the generator (s) 106 over a range of expected operational conditions, and calculating the slew rate of the frequency over the operational range, and setting the slew rate threshold above that calculated slew rate. If the slew rate calculated by the slew rate calculation module 160 exceeds the slew rate threshold, the controller 120 stores in the memory 152 an indication that the anomalous condition exists. The indication can be, for example, a flag in a register or memory location that indicates one or more anomalous condition (i.e., any condition that deviates from a normal, operational, or expected condition of any device in the islanded electrical system 112).

The controller 120 can also receive a load change signal 136 from one of the loads 130, which indicates that an operational status of one of the loads 130 has changed. A load status can be starting, running, stopping, on, off, standby, online, offline, for example. Upon receiving the load change status signal 136, the calculation module 142 receives a further set of frequency magnitude values, such as one per cycle of the AC current or alternately every 100 ms, of the AC current measured by the IED 108. In general, when an operational status of a load changes, the IED 108 is configured to capture and send to the controller 120 a "burst" of high-speed frequency values, such as once per cycle of 50-60 values per second, to the calculation module 142. When the islanded electrical system 112 returns to a quiescent or steady-state operational status, the IED 108 reconfigures the frequency measurements to a much slower rate, such as one per second. The IED 108 typically has a limited amount of memory, and in some configuration, network bandwidth is limited (such as when the IED 108 communicates its data using a MODBUS® protocol), so it is not desirable to measure the frequency at a high-speed, particularly where the frequency is generally stable and non-varying over time. Other measured characteristics can vary more widely, depending upon the loading of the islanded electrical system 112, but the frequency characteristic tends to be relatively stable. Thus, the present disclosure automatically configures the IED 108 to measure "bursts" of frequency only where necessary to determine whether an anomalous condition exists in the islanded electrical system. In this way, memory utilization is conserved and network bandwidth is not over-burdened.

The controller 120 stores a second set of frequency data indicative of the measured further set of frequency magnitude values and corresponding second timestamp values corresponding to a time each of the further set of frequency magnitude values are measured in the memory 152. The slew rate calculation module 160 calculates a second slew rate of frequency based on the second frequency data and the second timestamp values. Again, the second frequency data in this example is associated with a recent change in the operational status of one of the loads 130. If the second slew rate exceeds a second slew rate threshold provided by the thresholds module 146, the slew rate calculation module 160 stores a second indication that the islanded electrical system has experienced a potential instability condition. This condition can be different from the anomalous condition, which is a general condition. A potential instability condition is more specific, and indicates a more specific potential problem with the islanded electrical system 112, i.e., potential instability. The operator can then determine whether further action is needed to be taken to remediate the potential instability condition.

As mentioned above, the anomalous condition is determined based on at least the slew rate, but in other implementations, the anomalous condition can be further based on the frequency magnitude values. In such an implementation, the controller 120 compares each or some of the measured frequency magnitude values with a frequency magnitude threshold retrieved from the thresholds module 146. When any of the frequency magnitude values exceed the frequency magnitude threshold, for example regardless of the slew rate, the controller 120 stores an indication that an anomalous condition exists. For example, if the frequency suddenly increases above a given threshold, the calculation module 142 may not react quickly enough to the increase. This continuous comparison of the frequency magnitudes against a frequency threshold ensures that sudden anomalies are detected immediately.

As mentioned above, the high-speed frequency measurements are taken in "bursts" when needed. One such event can occur when the controller 120 receives a power source change signal 122 from the ATS 104, indicating, for example, that the source of power has switched from the utility grid 102 to the alternate power source 110. When this occurs, the ATS 104 sends a power source change signal 122 to the controller 120, indicating the change of power source from the utility grid 102 to the alternate power source 110, and the controller 120 instructs the IED 108 to send the frequency magnitude values at a high speed, such as once or twice per cycle of AC current or voltage waveform. Alternately or additionally, the high-speed frequency measurements can be initiated in response to the controller 120 receiving a load status change signal 136 from one or more of the loads 130, indicating a change of the operational status of the load 130. When this occurs, there is a greater probability that an anomalous condition occurred in response to load changes, so the controller 120 instructs the IED 108 to begin capturing and reporting a burst of high-speed frequency magnitude values for a predetermined period of time (e.g., 1 or 2 seconds or longer) before resuming to its normal (when the islanded electrical system 112 is in equilibrium) frequency capture rate, such as once per second (which differs from the periodicity of the high-speed frequency capture rate).

For example, when the high-speed frequency capture rate is captured according to a first periodicity (e.g., once or twice per cycle of AC current), the controller 120 changes the periodicity to a second periodicity that is slower than the first periodicity when a steady-state condition is achieved in the islanded electrical system. For example, the second periodicity may be one frequency measurement per second or per minute. To change the periodicity, the controller 120 instructs the IED 108 via the IED control signal to adjust the periodicity of frequency measurements from the first periodicity to the second periodicity. For example, the second periodicity can be a default periodicity programmed into the IED 108, so the controller 120 can instruct the IED 108 to revert the periodicity to the default periodicity. This saves network bandwidth, unnecessary memory overuse, and premature storage overflow in that high-speed bursts of frequency measurements are taken only when the controller 120 detects a relevant change in the islanded electrical system 112 that warrants a closer analysis of the frequency data. Otherwise, the IED 108 captures the frequency at a normal programmed rate or not at all in other implementations. For example, the frequency can be derived from the current or voltage measurements and either the IED 108 or the controller 120 can analyze the current or voltage waveforms to determine the frequency on a cycle-by-cycle or half-cycle-by-half-cycle basis or over a longer period, such as over a one second or one minute interval. The islanded electrical system 112 can be deemed to be in a steady-state when the frequency of the AC current provided by the alternate power source 110 is stable over an interval of time. This interval of time can be determined by operating the loads 130 over a range of expected load operation in islanded mode and observing how long it takes for the system frequency to settle around a stable range (e.g., no more than +/−1% from the nominal frequency, e.g., 50 or 60 Hz+/−1%). The interval can be taken from this observed range of operation and programmed into the thresholds module 146. The controller 120 receives measurement data from the IED 108 at a rate determined by the second periodicity until the controller 120 detects an anomalous change in the islanded electrical system 112. The measurement data can be of any characteristic of the AC signal measured by the IED 108, such as current, voltage, and the like, or any value derived from the current or voltage, such as frequency or power. Examples of an anomalous change include a change in a characteristic of the electricity provided by the alternate power source 110, a change of a status of the alternate power source 110, a change in a characteristic of the alternate power source 110, or a change of a status of any of the loads 130 in the islanded electrical system 112. Upon the controller 120 detecting the anomalous change, the controller 120 causes the IED 108 to change the second periodicity back to the first periodicity to begin recording and reporting the frequency in a "burst" mode corresponding to the first periodicity (e.g., once or twice per cycle) over a predetermined interval of time. Examples of a characteristic of the alternate power source 110 include a speed at which an engine of a generator 106 of the alternate power source 110 is rotating or a voltage output of the alternate power source 110.

As mentioned above, the IED 108 can also report to the controller 120 measured voltage data on a voltage data line 108*b*. The voltage data corresponds to a measured voltage of the AC current being provided by the alternate power source 110 with respect to a reference voltage, such as neutral or earth ground. The controller 120 can use the measured voltage data to verify whether the anomalous condition exists in the islanded electrical system 112 by comparing whether changes in the voltage data track changes in the frequency data. For example, voltage and frequency are directly related such that when the system frequency increases, so too does the system voltage. Thus, the rate of the change in the system frequency should track the rate of change of the system voltage. The controller 120 can verify this relationship to confirm the existence of an anomalous condition in the islanded electrical system 112.

The thresholds module 146 can store the slew rate threshold, which in some implementations can include a low threshold and a high threshold above the low threshold. The slew rate calculation module 160 determines whether the calculated slew rate is above the high threshold or below the low threshold. In other words, the slew rate threshold can define a range of acceptable slew rates, and the controller 120 determines whether the calculated slew rate is outside of that acceptable range. If the slew rate is above the high threshold, the controller 120 determines at least one of the loads 130 is available to be turned on, and if so, the controller 120 causes the frequency of the AC current to decrease by turning on that load 130 via the load control signal 138. On the other hand, if the slew rate is below the low threshold, the controller 120 determines whether at least one of the loads 130, such as a non-critical load, is available to be turned off, and if so, the controller 120 causes the frequency of the AC current to increase by turning off the at least one load 130 via the load control signal 138. The load 130 receives an instruction to turn the load on or off (or standby) from the controller 120 via the load control signal 138, and in response, turns itself on or off (or goes into standby).

The controller 120 can receive, from some or all of the loads 130 via corresponding load control signals 138 or from or perhaps derived from the IED 108, an operational status of each of the loads 130. The (load) operational status includes running in which the load 130 is turned on or stopped in which the load is turned off (as used herein, off includes standby or offline, because the load control signal 138 can be used to "wake up" the load 130). The high-speed frequency analysis module 144 can store in the memory 152 information indicating the status of all communicative loads 130 and which of the loads 130 was turned on or off in response to determining whether the slew rate exceeds the slew rate threshold and when and by how much the frequency of the AC current increased or decreased in response to turning the load 130 on or off along with a timestamp corresponding to the time that the load 130 was turned on or off. The high-speed frequency analysis module 144 can use this information to keep a historical database of how changes made to return the frequency back near its nominal or fundamental value affected the frequency based in part on knowledge of the status of all loads 130 in the islanded electrical system 112. The controller 120 can consult this information in deciding which and how many loads to turn on or off to achieve a desired adjustment of the frequency as quickly as possible back to its nominal or expected value.

In implementations in which the alternate power source 110 includes one or more generators 106, the controller 120 can receive a generator operational status signal 124 indicating an operational status of the generator. The operational status can include running indicating that the generator is running, starting indicating that the generator is starting, or stopping indicating that the generator is stopping. The controller 120 uses the statistical function module 148 to compare, using a statistical function, the measured frequency data or the calculated slew rate with present or historical data associated with the islanded electrical system 112 to project an instability trend or to predict a future performance of the islanded electrical system 112. Based on this comparison, the controller 120 stores in the memory 152 a result indicative of the projected instability trend or the predicted future performance.

The controller 120 can determine whether the operational status of the generator 106 has transitioned from off to on, and therefore is in a starting operational mode. If not (e.g., the generator is running or stopping), the controller 120 compares, using a statistical function from the statistical function module 148, the calculated slew rate with a historical slew rate to project an instability trend of the islanded electrical system 112. Alternately, the controller 120 compares, using a statistical function from the statistical function module 148, the measured frequency data (from the IED 108) with a present or historical voltage or current of the electrical power measured by the IED 108 to project an instability trend of the islanded electrical system.

If the operational status of the generator is determined to be starting, the controller 120 determines a pick-up time for the generator 106 to pick up one of the loads 130 and compares using a statistical function from the statistical function module 148 the pick-up time with a historical pick-up time for the generator 106 to predict a future performance of the generator 106 in the islanded electrical system 112. The controller 120 can continuously buffer frequency data in a FIFO manner so that when the generator 106 is commanded to start, pre-event frequency data will be available in the FIFO stack for analysis with the event and post-event frequency data. Alternately, the controller 120 determines an actual loading that has been transferred to the generator 106 after the generator 106 comes up to speed and compares the actual loading with a historical loading for the generator 106 to predict a future performance of the generator 106 in the islanded electrical system 112. The controller 120 can also determine speed profiles associated with starting the generator 106, how long it takes the generator 106 to achieve its target speed, and to complete the load transfer. Alternately, the controller 120 calculates a speed of the generator 106 as the generator is starting and a time elapsed for the generator 106 to transition from the starting operational status to the running operational status and compares using a statistical function from the statistical function module 148 the calculated speed and elapsed time with a historical speed and elapsed time for the generator 106 to predict a future performance of the generator in the islanded electrical system 112. Alternately, the controller 120 can compare using a statistical function from the statistical function module 148 the frequency data provided by the IED 108 while the generator 106 is transitioning from the starting operational status to the running operational status with corresponding frequency data measured by the IED 108 while the operational status of the generator 106 is running to project an instability trend of the islanded electrical system 112.

The slew rate can be either positive or negative where a positive slew rate corresponds to increasing frequency values and a negative slew rate corresponds to decreasing frequency values. A higher initial slew rate (df/dt) during a frequency perturbation typically indicates a more significant load change (either adding or removing load from the islanded electrical system 112). While a high slew rate by itself may not lead to instability within the islanded electrical system 112, it can be symptomatic of poor load management (i.e., the methodology for turning loads on and off) of the islanded electrical system 112. Better load management and/or additional generator capacity can reduce high slew rates under normal operational conditions. Abnormal operating conditions such as faults can be more problematic and can cause islanded electrical system 112 instability (along with momentarily high slew rates).

An acceptable slew rate depends on the inherent stability of the islanded electrical system 112 in question. An islanded electrical system that is loaded to its threshold may not be able to recover from an electrical event that produces a seemingly benign slew rate; however, a lightly loaded electrical system may be able to withstand an electrical event with a very high slew rate. Accordingly, it is helpful to analyze an electrical event's slew rate with its corresponding rate of recovery. If the rate of recovery is rapid, then a high slew rate may be irrelevant. However, if the rate of recovery is slow, then a high slew rate may indicate a potential for instability. Furthermore, this problem can be compounded if frequency oscillations (including local modes) are present in the islanded electrical system 112.

Slew rate can be leveraged in conjunction with other event characteristics such as the event's rate of recovery, the corresponding system load, and/or the presence of frequency oscillations in the islanded electrical system 112.

There are several characteristic traits of an event within the islanded electrical system 112 that can be used to analyze the severity (e.g., duration or magnitude) of a system frequency perturbation (e.g., a unidirectional deviation in the frequency of the electrical current supplied by the alternate power source 110 away from the nominal or fundamental value caused by, for example, changes in the loading of the islanded electrical system 112, or an oscillatory perturbation or "ringing" in the system frequency caused by the presence of one or more frequency components riding on top of the fundamental frequency). Two of these traits (magnitude and slew rate) are discussed above. A third trait that can be considered is the islanded electrical system's rate of recovery. The rate of recovery is determined by the islanded electrical system's (or more accurately, the system generator(s) 106) ability to return to its pre-event speed after the frequency perturbation occurs. Another term for rate of recovery as used in this context is isochronous control.

When a frequency event occurs in the islanded electrical system 112 (e.g., a large load starts to run or turns off or an electrical fault occurs), a generator's speed will change depending on whether load was added to or taken offline from the islanded electrical system 112. The generator's internal speed governor will attempt to bring the frequency back to its nominal or fundamental level by adjusting the fuel position to the engine of the generator 106 accordingly. For example, the generator's governor will respond by increasing fuel to the engine of the generator 106 to maintain isochronous control (i.e., recover its targeted speed) when a load is added. A combination of dynamics (e.g., changes in loads, inertia, etc.) can result in overshooting the targeted speed, resulting in the governor then reducing fuel to the generator's engine. Ultimately, a stable condition may never occur and the generator 106 may trip off due to an engine overspeed or underspeed condition. To prevent this problem, generator governors can use speed droop to reduce the reference speed as a function of the increase in the fuel position (due to a load increase). Speed droop is a way of providing more stable frequency control by reducing the governor's reference speed as the fuel position (load) increases. If a load is suddenly added to the electrical system, the speed droop control adjusts the governor's targeted speed down in the direction of the off-speed condition as more fuel is provided to the engine of the generator 106. In most cases, the speed droop is temporary, facilitating a smooth return to the targeted nominal speed.

If the governor's settings are just right, the engine of the generator 106 will return to its targeted speed. Conversely, improper or overly conservative settings of the governor can result in a trip on an overspeed or an underspeed condition, potentially leaving the islanded electrical system 112 with a power deficit. Deficit conditions can lead to further instability, resulting in additional generator trips and so forth.

The rate of recovery for a frequency deviation can be measure using absolute threshold values (time) or relative threshold values (%). An absolute threshold setting delineates between an acceptable recovery time and an unacceptable recovery time. This setting can be defined and configured by the end-user or auto-learned based on acceptable historical data ranges. The unit value that is configured for an absolute threshold is time (expressed, e.g., in cycles or seconds). A learned method for configuring this setting can be based on a historical "normal" range plus a small tolerance. For example, if the "worst case" recovery time is 3 seconds during the learning period, then the absolute threshold can be set at 3 seconds plus a small tolerance (e.g., 5% of the 3 seconds or 0.15 seconds) for a total setting of 3.15 seconds (or 189 cycles using a nominal frequency of 60 Hz).

A relative threshold can be expressed as a percentage setting, which delineates between a normal and abnormal time to recover. Like the absolute threshold setting, the relative threshold setting can be defined and configured by the end-user or auto-learned based on historical data ranges. The unit of the value to be configured for the relative threshold setting is a percent (or a fractional value). For example, a manually configured relative threshold setting can be 10% (or 0.10), meaning that the time between pickup and dropout of the over/under frequency alarm is allowed to increase no more than 10% above a previous over/under frequency event.

Statistical trending of historical data can be useful to indicate the inclination of the stability of the islanded electrical system 112 over time due to load operation or alterations. While the stability of the islanded electrical system 112 can be highly dependent on the magnitude of loads starting, stopping, or the number or severity (e.g., duration) of faults occurring, etc., an overall trend of frequency events during islanded conditions can be useful from an analysis standpoint.

Finally, evaluating the degree of frequency oscillations (e.g., deviations in the system frequency above and below its nominal or fundamental value) during a perturbation or electrical event (also termed a "frequency deviation event") can provide an indication of the system's stability. This can be determined by observing swings in the measured system frequency from under frequency (below the nominal or fundamental value) to over frequency (above the nominal or fundamental value) or vice versa. In some cases, the oscillations will eventually attenuate or dampen and the system frequency will return to relative stability at or near the targeted nominal or fundamental frequency (e.g., 50 or 60 Hz). However, a goal of speed droop control in the governor of an engine of the generator 106 is to minimize or eliminate these oscillations and provide a more stable frequency during load changes or electrical events. Excessive oscillations can be an indication that the islanded electrical system 112 is susceptible to instability. The oscillations in the system frequency can be evaluated by analyzing the pickup and dropout alarms above and below the target frequency to identify their presence and severity (e.g., duration). The presence of oscillations can be determined by observing a pickup and dropout on both sides of the target frequency during a single frequency deviation event. The severity of oscillations can be quantified by the number and duration of these alternating alarms within a single frequency deviation event.

While the foregoing description has described various algorithms, methods, or implementations for identifying probable or potential instability issues in an islanded electrical system, the blocks or modules in the following flow charts can be used in conjunction with any of the foregoing algorithms, methods, or implementations.

Figure 2:
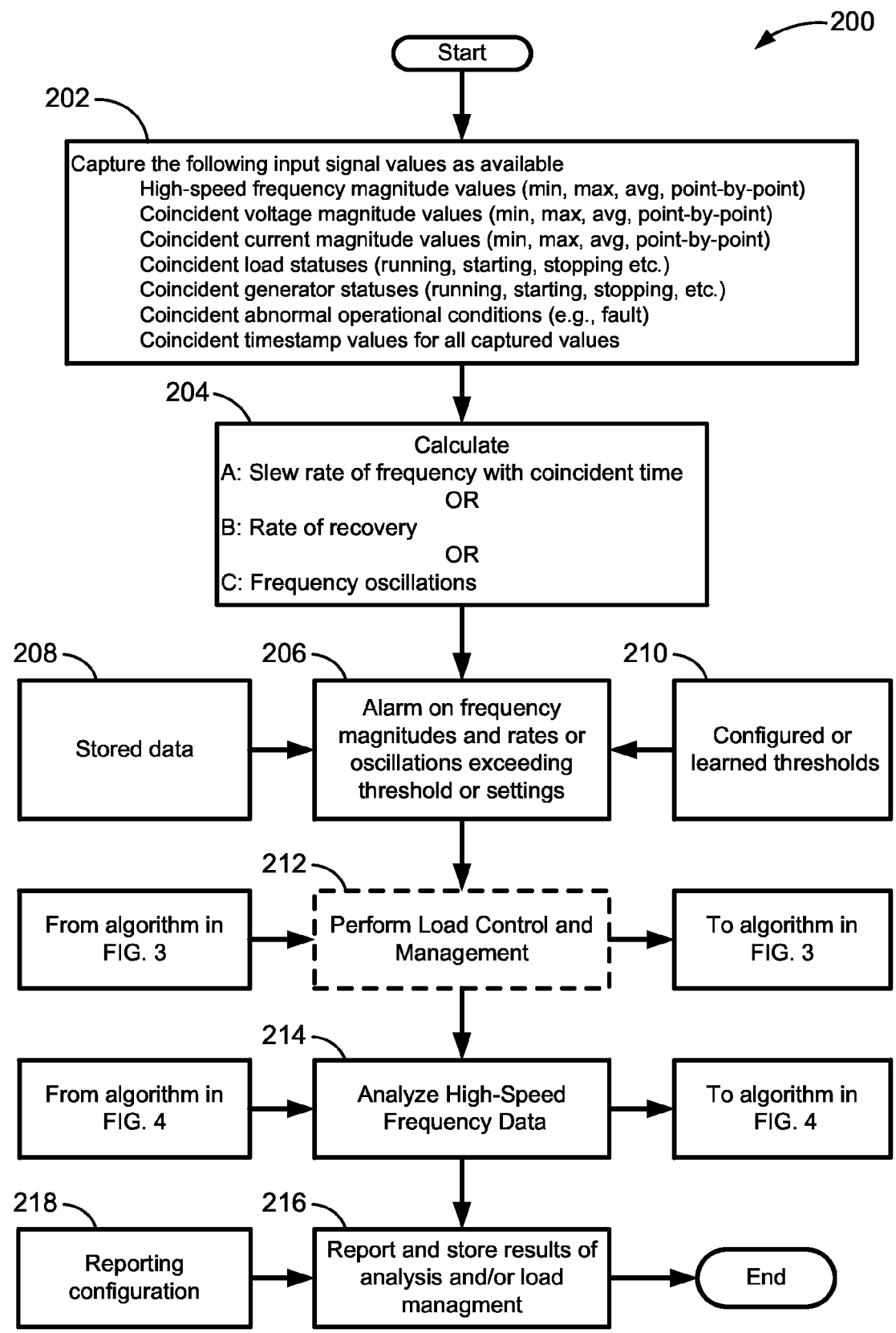
FIG. 2 is a flow chart diagram of an algorithm carried out by the controller shown in FIG. 1A for identifying a probable instability condition of an islanded electrical system, such as the example electrical system shown in FIG. 1A.

Referring now to FIG. 2, a flow chart diagram illustrates an algorithm 200 carried out by the controller 120 shown in FIG. 1A for identifying a probable or potential instability condition of an islanded electrical system, such as the example electrical system shown in FIG. 1A. The algorithm 200 captures any or all of the following input signal values in block or module 202: high-speed frequency magnitude values (such as a minimum frequency value, a maximum frequency value, an average frequency value evaluated over a period of time, or point-by-point frequency values, such as from peak-to-peak of the current or voltage waveform). These values can be captured by the IED 108 and communicated along lines 108a, b,c to the controller 120 shown in FIG. 1A. The algorithm 200 can capture coincident (with the frequency measurements) voltage magnitude values of the voltage corresponding to the power signal being monitored by the IED 108, such as a minimum voltage magnitude value, a maximum voltage magnitude value, an average voltage magnitude value, or point-by-point voltage magnitude values from peak-to-peak of the current or voltage waveform being monitored by the IED 108. The IED 108 can communicate the measured voltage magnitude values along the line 108b to the controller 120. The algorithm 200 can capture coincident (with the frequency and/or voltage measurements) current magnitude values (minimum, maximum, average, or point-by-point as discussed above) corresponding to the current measured by the IED 108 being supplied by the alternate power source 110. The IED 108 can communicate the current magnitude values along the line 108c to the controller 120. Coincident with capturing any or all of the foregoing, the algorithm 200 can capture one or more load statuses (for example, running, starting, or stopping) from the one or more (critical) load(s) 130 by way of the load status change signal 136 communicated from the load 130 to the controller 120. Coincident with capturing any or all of the foregoing, the algorithm 200 can capture one or more generator statuses (e.g., running, starting, or stopping) from the one or more generator(s) 106 by receiving at the controller 120 the generator operational status signal 124. Coincident with capturing any or all of the foregoing, the algorithm 200 can capture any abnormal operational condition, such as an electrical fault, from the IED 108, load(s) 130, generator(s) 106, ATS 104, for example. Finally, coincident with capturing any or all of the foregoing, the algorithm 200 can capture timestamp values associated with any or all of the captured values. The timestamp values can be a time (e.g., in hours, minutes, seconds, milliseconds) or a cycle count (e.g., at cycle count number 4562, corresponding to a 60 Hz cycle frequency), and each timestamp value is associated using the controller 120 with the time or moment when the value, status, or condition was detected, measured, or occurred.

Figure 1B:
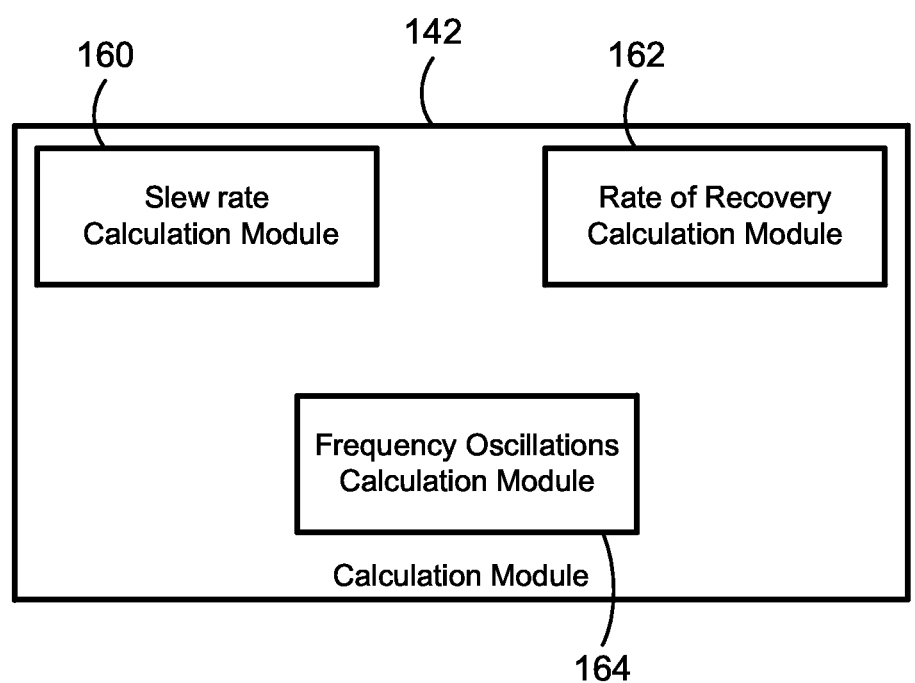
FIG. 1B is a functional block diagram of the calculation module shown in FIG. 1A.

In block 204, the algorithm 200 calculates any one or more of the following instability characteristics: slew rate of the system frequency with coincident timestamp values corresponding to each frequency measurement, which can be calculated by the slew rate calculation module 160 shown in FIG. 1B; or the rate of recovery of the system frequency following a deviation from the nominal or fundamental value, which can be calculated by the rate of recovery calculation module 162 shown in FIG. 1B; or the severity (e.g., duration) of oscillations of the system frequency following a perturbation or deviation from the nominal or fundamental value, which can be calculated by the frequency oscillations calculation module 164 shown in FIG. 1B.

In block 206, the algorithm 200 can communicate an alarm to an external system, such as a computer, when the measured frequency magnitudes and the calculated slew rate of the system frequency or the calculated rate of recovery of the system frequency or the calculated severity (e.g., duration) of the frequency oscillations exceeds a threshold or a setting. The stored data 208 can correspond to the measured frequency data and the results of the calculation modules 160, 162, and/or 164. Block 106 can also receive configured or learned thresholds 210 as an input for comparison against the measured or expected frequency or voltage magnitudes or calculated rates or oscillations determined by the modules 160, 162, 164.

Figure 3:
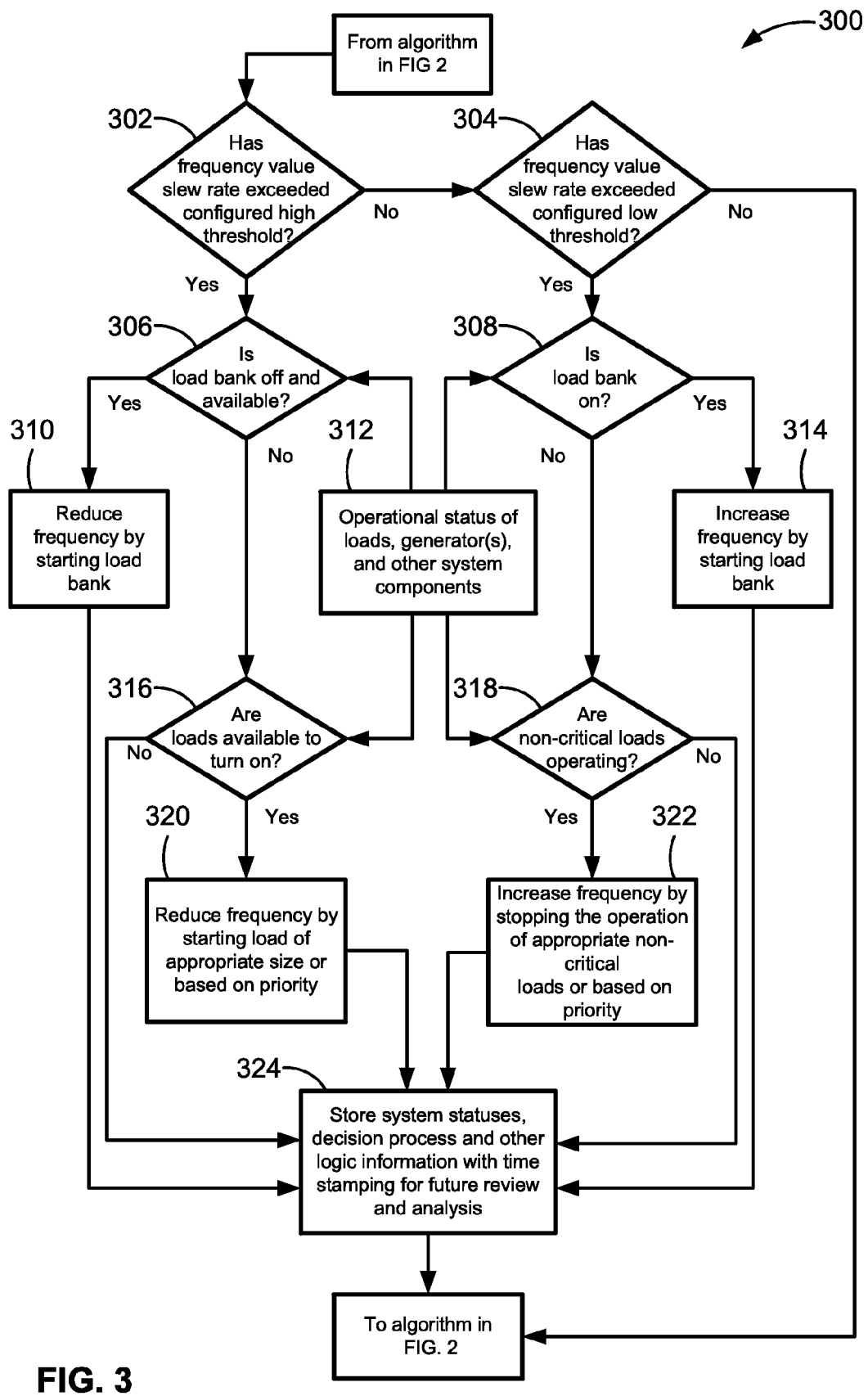
FIG. 3 is a flow chart diagram of a load-control algorithm that can be carried out by the controller shown in FIG. 1A for compensating for frequency deviations by turning loads on or off within an islanded electrical system.

In block 212, the algorithm 200 can optionally perform load control and management as described in more detail in FIG. 3. In general, the algorithm 200 can selectively turn designated loads or load banks on or off to assist the system frequency in returning to its nominal or fundamental value as quickly as possible and avoid a would-be instability condition of the system frequency. These details are described in connection with FIG. 3 below.

In Block 214, the algorithm 200 can analyze the high-speed frequency data that was captured by the IED 108 at a high-speed, such as once or twice per cycle of the system frequency (e.g., at a rate of at least 60 or 120 measurements per second). By capturing a "burst" of frequency measurements or other measurements such as current, voltage, the algorithm 200, using the high-speed frequency analysis module 144 shown in FIG. 1A, can project or predict instability issues before they actually occur, and can capture pre-event data from the FIFO buffer for use in conjunction with post-event analysis through data buffering. These details are described in connection with FIG. 4 below.

Figure 4:
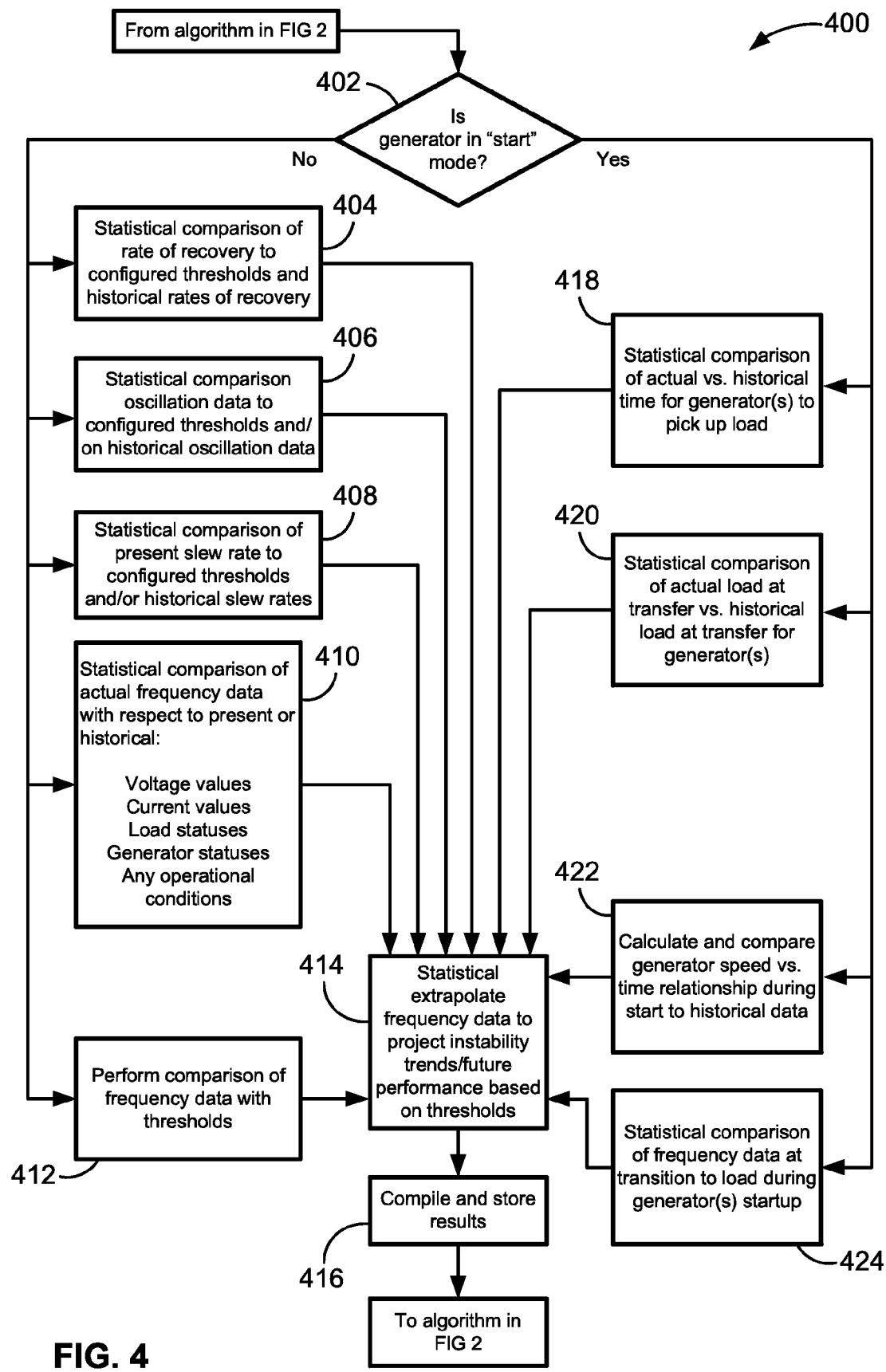
FIG. 4 is a flow chart diagram of a high-speed frequency data analysis algorithm that can be carried out by the controller shown in FIG. 1A for analyzing high-speed frequency data using statistical methods to project instability trends or future performance of an islanded electrical system.

Using reporting configuration details 218, in block 216, the algorithm 200 can report and store the results of (a) the high-speed analysis shown in FIG. 4 from the high-speed frequency analysis module 144 or (b) the load management (e.g., how operating a load affected the system frequency).

FIG. 3 is a flow chart diagram of a load-control algorithm 300 that uses the load control signal 138 to control one or more loads 130 or the load bank control signal 134 to control a load bank 132. A purpose of load control is to turn loads on or off to affect the system frequency and cause it to return to its nominal or fundamental value as quickly as possible before a potential instability condition occurs. This proactive approach intelligently manages loads while monitoring the system frequency to obtain an optimal stabilization of the system frequency. The algorithm 300 determines whether the calculated slew rate (e.g., calculated by the slew rate calculation module 160) exceeds a configured high threshold (302). If so, the algorithm 300 determines whether a load bank is off and available (306), such as by receiving a load bank status signal 135 indicating a status (e.g., on or off) of the load bank 132 (306). If so, the algorithm 300 reduces the system frequency by starting the load bank 132 via the load bank control signal 134 (310). If a load bank 132 is not off or available (306), the algorithm 300 determines whether one or more loads 130 are available to turn on (316). If so, the algorithm 300 instructs a load 130 of appropriate size or based on a load priority to start, thereby reducing the system frequency (320). In determining whether a load bank 132 is off and available (306) or whether loads 130 are available to be turned on (316), the algorithm 300 receives operational status information of the loads 130, the load bank 132, the generator(s) 106, and from other system components, such as the ATS 104 (312). This operational status information 312 is used by the algorithm 300 to determine whether loads 130 or load banks 132 are off or on or available.

Returning to block 302, if the slew rate calculated by the slew rate calculation module 160 has not exceeded a configured high threshold (302), the algorithm 300 determines whether the calculated slew rate exceeded a configured low threshold, which is lower than the configured high threshold (304). If so, the algorithm 300 determines whether the load bank 132 is on (308) by interrogating the load bank status signal 135 to ascertain the operational status (e.g., on or off) of the load bank 132. If the load bank is on, the algorithm 300 instructs the load bank 132 to turn off via the load bank control signal 134, thereby causing the system frequency to increase (314). If the load bank 132 is not on (308), the algorithm 300 determines whether any non-critical loads 130 are operating (318). As mentioned above, the block 130 can include any number of loads, which can be composed of non-critical and/or critical loads. If non-critical loads are operating (318), the algorithm 300 stops the operation of appropriate non-critical loads 130 via the load control signal 138 or based on a configured priority (322), thereby causing the system frequency to increase.

The outputs and decisions of all the blocks 310, 136, 320, 322, 318, 314 are stored in block 324, which includes the system statuses (e.g., statuses of any loads or load banks turned on or off), decision process (e.g., which load was turned from on to off and why), and other logic information, along with time stamping of each decision for future review and analysis. In addition, the effect on the system frequency before and after an operational status of a load 130 or load bank 132 was changed is recorded. Control is returned to the algorithm 200.

FIG. 4 is a flow chart diagram of a high-speed frequency data analysis algorithm 400 that can be carried out by the controller shown in FIG. 1A for analyzing high-speed frequency data using statistical methods to project instability trends or future performance of an islanded electrical system. The high-speed frequency data can be analyzed by the high-speed frequency analysis module 144. The algorithm 400 determines whether the generator 106 is in a "start" operational mode (402) by receiving the generator operational status signal 124. This check initiates a high-speed frequency analysis in response to the generator 106 transitioning from an off to an on status to determine that the generator 106 comes up to speed within expected parameters, because the system frequency can be erratic during generator startup and not indicative of system instability. The algorithm 400 trends generator startups over time to identify outliers and flag or alarm when an outlier is detected during a subsequent startup. If the generator 106 is not in a start mode (402), the algorithm 400 carries out a statistical comparison of the following parameters, in any order and in any combination. In block 404, the algorithm 400 carries out a statistical comparison of the rate of recovery of the system frequency to configured thresholds and historical rates of recovery. This data can be used to adjust load management and control for future detected instability conditions to cause the rate of recovery of the system frequency to converge more quickly to the nominal or fundamental value. Alternately, the data can be used to adjust the configured thresholds to be more or less aggressive so that future calculated rates of recovery cause the system frequency to converge to its nominal or fundamental value more quickly.

In block 406, the algorithm 400 carries out a statistical comparison of the frequency oscillation data to configured thresholds and/or to historical oscillation data. In response to this comparison, the configured thresholds can be changed or load control management can be adjusted to minimize the severity of oscillations superimposed on the system frequency in response to future instability issues, causing the system frequency to converge faster to its nominal or fundamental value following an electrical anomaly in the islanded electrical system 112.

In block 408, the algorithm 400 carries out a statistical comparison of the calculated slew rate to configured thresholds and/or historical slew rates. This comparison data can be used similar to the comparison data described above to adjust thresholds or management of load control.

In block 410, the algorithm 400 carries out a statistical comparison of actual frequency data with respect to present or historical: voltage values, current values, load statuses, generator statuses, or any other operational conditions in the islanded electrical system 112. This data can be used to find correlations in how the system frequency behaves relative to these other values or statuses. For example, if a particular load control procedure was particularly effective at returning the system frequency to nominal, that procedure can be correlated with the measured frequency data so that the next time the system frequency behaves in a similar manner, the same load control procedure can be employed.

In block 412, the algorithm 400 compares the measured frequency data with thresholds. While thresholds alone may not necessarily indicate a potential instability condition in the islanded electrical system 112, how the system frequency fluctuates relative to configured low and/or high thresholds can be instructive in predicting instability.

If the algorithm 400 determines that the generator 106 is in the start mode (402), the algorithm 400 carries out a statistical comparison of the actual versus historical time it takes for the generator 106 to pick up the loads 130 (418). Alternately or additionally, the algorithm 400 carries out a statistical comparison of the actual load at the transfer (when the ATS 104 switches from the utility grid 102 to the alternate power source 110) with the historical load at a historical transfer for the generator 106 (420). The pick-up times and transfer times associated with generator 106 and the loading of the generator 106 can be instructive in predicting instability.

Additionally or alternately, the algorithm 400 calculates and compares the generator speed versus time relationship during the generator start to historical data (422). The speed versus time relationship of the engine of the generator 106 can be instructive in predicting instability.

Additionally or alternately, the algorithm 400 carries out a statistical comparison of measured frequency values during generator startup at the moment the power is transitioned to the loads 130. What happens to the frequency when load transition occurs during generator startup can be instructive in predicting instability.

The outputs of blocks 404-424 are provided to a statistical extrapolation module 414, which extrapolates the frequency data to project instability trends or to predict future performance of the system frequency based on thresholds. The algorithm 400 compiles and stores the results (416) and returns control to the algorithm 200.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. It will be readily understood that the IEDs 120a-e, the server 110, and/or the computer 140 can include such a suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular aspects, embodiments, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the invention(s) as defined in the appended claims.

What is claimed is:

1. A method of automatically identifying a probable instability condition of an islanded electrical system, the method comprising:

receiving, using a controller, an indication that power to a plurality of loads has been transferred from a primary power source to an alternate power source electrically isolated from the primary power source to form an islanded electrical system that includes the alternate power source and the loads, the alternate power source providing electrical power to the loads;

responsive to receiving the power source change signal, receiving a load status change signal from a load in the islanded electrical system indicating that an operational status of the load has changed;

responsive to receiving the first load change signal, receiving frequency magnitude values, according to a first periodicity corresponding to at least one per 100 ms, of the alternating current or voltage measured by an intelligent electronic device (IED) coupled in the islanded electrical system to the alternate power source, and storing frequency data indicative of the measured frequency magnitude values and associated timestamp values corresponding to a time or cycle count each of the frequency magnitude values are measured;

based on the received frequency magnitude values, identifying a pickup time corresponding to a detected deviation from a nominal or fundamental frequency of the electrical power and a dropout time corresponding to a restoration of the frequency of the electrical power to the nominal or fundamental frequency;

based on at least the pickup time and the dropout time, calculating a rate of recovery for the detected frequency deviation from the nominal or fundamental frequency;

the controller determining whether an anomalous condition exists in the islanded electrical system based on at least whether the calculated rate of recovery exceeds a rate of recovery threshold; and responsive to the rate of recovery exceeding the rate of recovery threshold, storing in a memory an indication that the anomalous condition exists.

2. The method of claim 1, wherein the rate of recovery is calculated using an absolute threshold by determining a time period between the pickup time and the dropout time or using a relative threshold by determining a percentage by which the time period between the pickup time and the dropout time exceeds a nominal time period indicating a normal rate of recovery, and wherein the alternate power source includes a generator having an engine.

3. The method of claim 2, wherein the rate of recovery threshold corresponds to the calculated time period or the calculated percentage plus a threshold tolerance value.

4. The method of claim 1, further comprising:
the controller calculating a slew rate of frequency based on the frequency data and the timestamp values, where the slew rate of frequency is the rate of frequency change with respect to time; and
the controller further determining whether the anomalous condition exists based on the slew rate by determining whether the slew rate exceeds a slew rate threshold.

5. The method of claim 4, further comprising, responsive to the controller determining that the anomalous condition exists based on the calculated rate of recovery, the controller using the calculated slew rate to confirm that the anomalous condition exists.

6. The method of claim 5, further comprising:
receiving a load change signal from a first of the loads that an operational status of the first load has changed;
responsive to receiving the first load change signal, receiving a further set of frequency magnitude values, at least one every 100 ms, of the alternating current or voltage measured by the IED and storing second frequency data indicative of the measured further set of frequency magnitude values and corresponding second timestamp values corresponding to a time each of the further set of frequency magnitude values are measured;
the controller calculating a second slew rate of frequency based on the second frequency data and the second timestamp values; and
responsive to the second slew rate exceeding a second slew rate threshold, storing a second indication that the islanded electrical system has a potential instability condition.

7. The method of claim 5, wherein the determining whether the anomalous condition is based further on the frequency magnitude values, and further includes the controller comparing the frequency magnitude values with a frequency magnitude threshold, wherein the storing the indication that the anomalous condition exists is further carried out responsive to any of the frequency magnitude values exceeding the frequency magnitude threshold.

8. The method of claim 5, further comprising receiving, using the controller, a status signal from the ATS indicating that power to the loads has been transferred, wherein the frequency magnitude values are received responsive to the receiving the power source change signal from the ATS.

9. The method of claim 5, further comprising:
receiving, using the controller, a load status change signal from a first of the loads indicating a change of status of the first load, wherein the frequency magnitude values are received responsive to the receiving the load status change signal from the first load.

10. The method of claim 5, further comprising:
changing the first periodicity at which the frequency magnitude values are measured to a second periodicity that is slower than the first periodicity when a steady-state condition is achieved in the islanded electrical system, where in the steady-state a frequency of the electrical current provided by the alternate power source is stable over an interval of time;
receiving measured data, according to the second periodicity, of a characteristic of the current or voltage measured by the IED until an anomalous change in the islanded electrical system is detected, where the anomalous change indicates a change in a characteristic of the electricity provided by the alternate power source, a change of a status of the alternate power source, a change in a characteristic of the alternate power source, or a change of a status of any of the loads in the islanded electrical system; and
responsive to detecting the anomalous change, changing the second periodicity back to the first periodicity and causing the IED to measure frequency magnitude values according to the first periodicity over a predetermined interval of time.

11. The method of claim 10, wherein:
the characteristic of the electricity includes current or voltage or a value derived from the current or the voltage,
the status of the alternate power source includes on or off,
the characteristic of the alternate power source includes a speed at which an engine of the alternate power source is rotating or a voltage output of the alternate power source, and
the status of any of the loads includes at least on or off.

12. The method of claim 5, wherein the alternate power source includes an uninterruptible power supply, the method further comprising:
receiving, using the controller, voltage data indicative of a voltage measured by the IED;
using the measured voltage data to verify whether the anomalous condition exists in the islanded electrical system by comparing whether changes in the voltage data track changes in the frequency data.

13. The method of claim 5, wherein the slew rate threshold includes a low threshold below the nominal or fundamental frequency and a high threshold above the low threshold and above the nominal or fundamental frequency, wherein the determining whether the slew rate exceeds the slew rate threshold includes determining whether the slew rate is above the high threshold or below the low threshold, the method further comprising:
responsive to the slew rate being above the high threshold, determining whether at least one of the loads is available to be turned on, and if so, causing the frequency of the alternating current to decrease by turning on the at least one load; and
responsive to the slew rate being below the low threshold, determining whether at least one of the loads is available to be turned off, and if so, causing the frequency of the alternating current to increase by turning off the at least one load.

14. The method of claim 13, further comprising:
determining, using the controller, an operational status of each of the at least some loads, the operational status including running in which the load is turned on or stopped in which the load is turned off; and
storing in the memory information indicating which of the loads was turned on or off in response to the determining whether the slew rate exceeds the slew rate threshold and when and by how much the frequency of the electrical power increased or decreased in response to turning the load on or off along with a timestamp corresponding to the time that the load was turned on or off.

15. The method of claim 5, wherein the alternate power source includes a generator, the method further comprising:
determining, using the controller, an operational status of the generator, the operational status including running indicating that the generator is running, on indicating that the generator is starting or on, or off indicating that the generator is stopping or off;
comparing using a statistical function the frequency data or the calculated slew rate with present or historical data associated with the islanded electrical system to project an instability trend or predict a future performance of the islanded electrical system; and based on the comparing, storing in the memory a result indicative of the projected instability trend or the predicted future performance.

16. The method of claim 15, the method further comprising:

determining whether the operational status of the generator is starting, and if not:

comparing using a statistical function the calculated slew rate with a historical slew rate to project an instability trend of the islanded electrical system, or comparing using a statistical function the frequency data with a present or historical voltage or current of the electrical power measured by the IED to project an instability trend of the islanded electrical system; and if the operational status of the generator is starting:

determine a pick up time for the generator to pick up one of the loads and compare using a statistical function the pick up time with a historical pick up time for the generator to predict a future performance of the generator in the islanded electrical system, or determine an actual loading of the generator while the generator is running and comparing the actual loading with a historical loading for the generator to predict a future performance of the generator in the islanded electrical system, or calculate a speed of the generator as the generator is starting and a time elapsed for the generator to transition from the starting to the running operational status and compare using a statistical function the calculated speed and elapsed time with a historical speed and elapsed time for the generator to predict a future performance of the generator in the islanded electrical system, or comparing using a statistical function the frequency data while the generator is transitioning from the starting to the running operational status with corresponding frequency data measured while the operational status of the generator is running to project an instability trend of the islanded electrical system.

17. A method of automatically identifying a probable instability condition of an islanded electrical system, the method comprising:

receiving, using a controller, an indication that power to a plurality of loads has been transferred from a primary power source to an alternate power source electrically isolated from the primary power source to form an islanded electrical system that includes the alternate power source and the loads, the alternate power source providing electrical power in the form of an alternating current to the loads;

responsive to receiving the indication that power to the loads has been transferred to the alternate power source, receiving a load status change signal indicating that an operational status of a load in the islanded electrical system has changed, causing a frequency deviation event in which a frequency of the alternating current deviates from a nominal or fundamental frequency of the alternating current;

responsive to receiving the load status change signal, receiving frequency magnitude values, according to a first periodicity corresponding to at least one per cycle of the alternating current, of the alternating current or voltage signal measured by an intelligent electronic device (IED) coupled in the islanded electrical system to the alternate power source, and storing frequency data indicative of the measured frequency magnitude values;

the controller analyzing the received frequency magnitude values to identify oscillations in the measured frequency magnitude values above and below a nominal or fundamental frequency for the alternating current during the frequency deviation event, the analyzing including quantifying a severity of the oscillations based on a number of times the measured frequency values exceed or drop below the nominal or fundamental frequency by more than a predetermined threshold;

the controller determining whether an anomalous condition exists in the islanded electrical system based on at least the severity of the oscillations during the frequency deviation event; and responsive to the controller determining that the anomalous condition exists, storing in a memory an indication that the anomalous condition exists.

18. The method of claim 17, wherein the alternate power source includes a generator having an engine, and wherein the predetermined threshold is based on a pickup or dropout alarm associated with the engine of the generator.

19. The method of claim 17, further comprising:

receiving associated timestamp values corresponding to a time each of the frequency magnitude values are measured;

the controller calculating a slew rate of frequency based on the frequency data and the timestamp values, where the slew rate of frequency is the rate of frequency change with respect to time; and the controller further determining whether the anomalous condition exists based on the slew rate by determining whether the slew rate exceeds a slew rate threshold.

20. The method of claim 17, further comprising:

based on the received frequency magnitude values, identifying a pickup time corresponding to a detected deviation from a nominal or fundamental frequency of the alternating current and a dropout time corresponding to a restoration of the frequency of the alternating current to the nominal or fundamental frequency;

based on the pickup time and the dropout time, calculating a rate of recovery for the detected frequency deviation from the nominal or fundamental frequency;

the controller further determining whether the anomalous condition exists in the islanded electrical system based on whether the calculated rate of recovery exceeds a rate of recovery threshold; and responsive to the rate of recovery exceeding the rate of recovery threshold, the controller determining that the anomalous condition exists.

* * * * *